United States Patent
Grossman et al.

[11] Patent Number: 5,960,175
[45] Date of Patent: Sep. 28, 1999

[54] IDENTIFICATION AND SELECTION OF A DESIRED SERVER FROM A PLURALITY OF SERVERS OF VARYING PROTOCOLS ON THE SAME NETWORK VIA A SINGLE BOOT ROM

[75] Inventors: Leonid Grossman, Cupertino; Sherman Lee, Rancho Palos Verdes, both of Calif.

[73] Assignee: Advanced Micro Devices, Inc., Sunnyvale, Calif.

[21] Appl. No.: 08/626,621

[22] Filed: Apr. 1, 1996

[51] Int. Cl.⁶ ................................. G06F 15/163
[52] U.S. Cl. ............... 395/200.52; 395/200.49; 395/200.5
[58] Field of Search ............... 395/200.1, 652, 395/200.16, 700, 200.8, 200.52, 200.49; 370/463

[56] References Cited

U.S. PATENT DOCUMENTS

| | | | |
|---|---|---|---|
| 4,926,420 | 5/1990 | Shimizu | 370/94.1 |
| 5,079,768 | 1/1992 | Flammer | 370/94.1 |
| 5,280,627 | 1/1994 | Flaherty et al. | 395/700 |
| 5,349,643 | 9/1994 | Cox et al. | 380/25 |
| 5,404,527 | 4/1995 | Irwin et al. | 395/700 |
| 5,408,507 | 4/1995 | McNamara et al. | 375/371 |
| 5,410,706 | 4/1995 | Farrand et al. | 395/700 |
| 5,530,808 | 6/1996 | Hammond et al. | 395/200.2 |
| 5,574,915 | 11/1996 | Lemon et al. | 395/700 |
| 5,577,210 | 11/1996 | Abdous et al. | 395/200.1 |
| 5,596,723 | 1/1997 | Romohr | 395/200.16 |
| 5,613,148 | 3/1997 | Bezviner et al. | 395/800 |
| 5,627,766 | 5/1997 | Beaven | 364/551.01 |

FOREIGN PATENT DOCUMENTS 06332716  12/1994  Japan ............... G06F 9/445

OTHER PUBLICATIONS

IBM Technical Disclosure Bulletin, vol. 37 No. 03, Mar. 1994, pp. 395–398, "Local Area Network diagnostics for a remote Program Load Environment".

*Primary Examiner*—Frank J. Asta
*Assistant Examiner*—Daniel Patru
*Attorney, Agent, or Firm*—Sawyer & Associates

[57] ABSTRACT

A computer network includes a plurality of servers, each of the plurality of servers operating under one of a plurality of operating systems, and a client workstation including a single boot ROM containing instructions for identifying each of the plurality of servers by address and by type of operating system, and selecting one of the identified servers by address and type for booting on the network.

23 Claims, 2 Drawing Sheets

IDENTIFICATION AND SELECTION OF A DESIRED SERVER FROM A PLURALITY OF SERVERS OF VARYING PROTOCOLS ON THE SAME NETWORK VIA A SINGLE BOOT ROM

FIELD OF THE INVENTION

This invention relates generally to boot ROMs, and more specifically to identification and selection of a desired server among multiple types and numbers of servers on a network using a single boot ROM.

BACKGROUND OF THE INVENTION

Among network protocols is a protocol known as remote program load (RPL) protocol. RPL protocol, originally developed by IBM, allows workstations, such as Heathcliff workstations, to connect to a network and download an operating system from a remote server for configuration on the network. The workstation typically employs a boot ROM on a network adapter card that stores the necessary RPL protocol information, thus allowing the workstation to operate with the network. Thus, the RPL protocol facilitates the use of less expensive workstations on the network.

Although originally developed by IBM, various implementations of the RPL protocol have been developed by other companies for use with their network software, including Novell and Microsoft, two major network system software companies. The variations among these implementations create difficulties, since the workstations cannot blindly attach to a network, but must first identify existence of an appropriate server type on the network to correspond with the implementation addressed by the boot ROM in the workstation.

In prior network configurations, typically only one server of a particular type was available. As networks developed, more than one server existed on the network, but typically only one of each server type appeared on a single network. A block diagram example of such a network is illustrated in FIG. 1. A client workstation 10, such as a Heathcliff workstation, on a network having a plurality of servers, including a Novell server 12, an IBM server 14, and a Microsoft server 16, typically boots to a first available server of an appropriate type for connecting to the network and performing the remote program load. It should be appreciated that server type as used herein refers to the type of system software and thus RPL protocol in use by the server.

With the ability to connect to a network using a boot ROM configured for a particular server type, there was usually no need to identify which particular server was being selected for booting. Problems develop, however, in the continued use of these techniques with ever-growing network sizes. Currently, networks tend to have multiple servers of each particular type on a network. Merely booting from a first responding server of a particular type is not guaranteed to allow the workstation access to the network, since the server may not be configured for use with that particular client.

Further, for networks of multiple server types, the ability to connect with more than one server type is often preferable. Unfortunately, accommodating multiple server types normally requires separate network cards, each card having a boot ROM configured for use with each particular server type.

A need exists for a method and system for remote booting to a network with multiple servers of multiple types with a client using a single boot ROM.

SUMMARY OF THE INVENTION

The present invention addresses these needs. A computer network in accordance with the present invention includes a plurality of servers, each of the plurality of servers operating under one of a plurality of operating systems, and a client workstation coupled to the plurality of servers, the client workstation including a single boot ROM, the single boot ROM containing instructions for identifying each of the plurality of servers by address and by type of operating system, and selecting one of the identified servers by address and type for booting on the network. The plurality of operating systems include IBM LAN Server 3.x operating system, IBM LAN Server 4.x operating system, Microsoft RPL Based Servers, and Novell Netware operating system. The instruction step of identifying further includes sending a FIND frame from the client to the network, receiving a FOUND frame from each of the plurality of servers, and determining a remote program load protocol followed by the server according to characteristics of the FOUND frame, including a frequency characteristic.

In one aspect of the present invention, a boot ROM for choosing a particular server on a network and performing a remote boot by a client, the network including a plurality of servers operating in accordance with a plurality of network operating systems, includes instructions for identifying each of the plurality of servers by address and by type of operating system, and selecting one of the identified servers by address and type for booting on the network. The instruction step of identifying further includes sending a FIND frame from the client to the network, and receiving a FOUND frame from each of the plurality of servers. A remote program load protocol followed by the server according to the FOUND frame is determined.

The instruction step of determining the protocol followed includes determining whether an identifying signature mark is located at a particular offset in a data portion of the FOUND frame. When the identifying signature mark is located, the server is identified as a first server type, where the first server type is a Novell server. Determining further includes determining whether a destination address of the FOUND frame is repeated in reverse order in a data portion of the FOUND frame. When the destination address is repeated in reverse order in the data portion of the FOUND frame, the server is identified as a second server type, the second server type being an IBM server operating under IBM LAN Server 3.x operating system.

The instruction step of determining further includes determining whether a destination address of the FOUND frame is repeated in a same order in a data portion of the FOUND frame, wherein when the destination address is repeated in a same order, a frequency of the FOUND frame is determined. When the frequency matches a frequency associated with a first frequency, the server is identified as a third server type, wherein the first frequency is an IBM frequency and the third server type is an IBM server operating under IBM LAN Server 4.x operating software. When the frequency does not match the frequency associated with the first frequency, the server is identified as a fourth server type, the fourth server type being a Microsoft RPL Based Server.

Identifying further includes forming a database table to store the address and type of operating system of each server, while selecting further includes choosing a particular one of the servers according to the stored address and operating system in the database table.

In a further aspect of the present invention, a boot ROM for choosing a particular server on a network and performing a remote boot by a client includes instructions for identifying each of a plurality of servers according to characteristics of a FOUND frame including a frequency characteristic, selecting one of the identified servers, and performing a remote program load by the boot ROM on a client through the selected one of the identified plurality of servers. The instruction step of identifying further includes determining whether a destination address of the FOUND frame is repeated in a same order in a data portion of the FOUND frame, wherein when the destination address is repeated in a same order, a frequency characteristic of the FOUND frame is determined. The frequency characteristic then allows distinguishing between an IBM server operating under IBM LAN Server 4.x operating software and a Microsoft RPL Based Server. The instruction step of identifying also includes determining if an identifying signature mark is located at a particular offset in a data portion of the FOUND frame, wherein when the identifying signature mark is located, the server is identified as a Novell server type. Additionally, identifying includes determining whether a destination address of the FOUND frame is repeated in reverse order in a data portion of the FOUND frame, wherein when the destination address is repeated in reverse order in the data portion of the FOUND frame, the server is identified as an IBM server operating under IBM LAN Server 3.x operating software.

The implementation of the identification and selection process into a single boot ROM in accordance with the present invention allows greater ability in choosing a server from which to boot to the network. Further, improved efficiency and lowered costs results from reducing the number of boot ROMs necessary to identify plural types and numbers of servers. Thus, the selectivity provided by the present invention ensures that with a single boot ROM the client workstation will successfully connect to a network having multiple numbers of multiple types of servers. These and other advantages of the aspects of the present invention will be more fully understood in conjunction with the following detailed description and accompanying drawings.

DETAILED DESCRIPTION OF THE INVENTION

The present invention relates to use of a single boot ROM for server identification and selection on a network. The following description is presented to enable one of ordinary skill in the art to make and use the invention and is provided in the context of a patent application and its requirements. Various modifications to the preferred embodiment and the generic principles and features described herein will be readily apparent to those skilled in the art.

Figure 3:
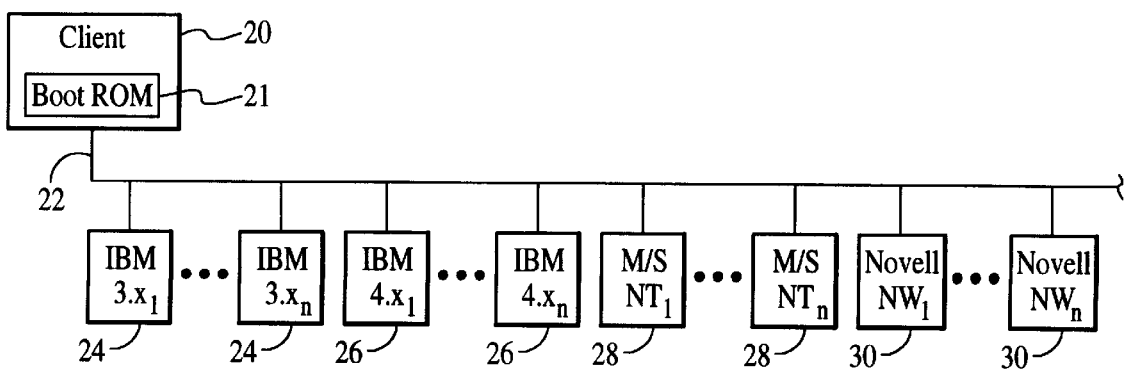
FIG. 3 illustrates a block diagram of a network in accordance with the present invention.

The present invention provides a single boot ROM utilizing a method to allow specific identification and selection of a desired server from a plurality of servers and server types on a single network. A block diagram example of such a network is illustrated in FIG. 3. As shown, a client workstation 20 is coupled to a network 22, the network 22 including multiple servers 24–30. The servers include, for example, IBM servers 24 operating with IBM LAN Server 3.x operating software, IBM servers 26 operating with IBM LAN Server 4.x operating software, Microsoft RPL Based Servers 28 and Novell servers 30 operating with Novell Netware software. Of course, the number of and types of servers shown by FIG. 3 is meant to be illustrative and not restrictive, so that other numbers and types of servers are capably included without departing from the present invention.

Figure 4:
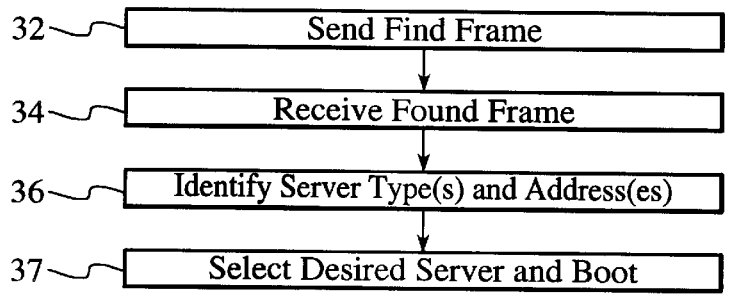
FIG. 4 illustrates a block flow diagram of a method of identification and selection of a server type and address in accordance with the present invention.

In accordance with the present invention, the client 20 employs a boot ROM 21 on a network adapter to perform a remote load of an operating system from a chosen server of the plurality of servers 24–30 to allow the client 20 to connect to and utilize the server network 22. An overall flow diagram of a method for selection with a single boot ROM is illustrated in FIG. 4.

In general, initiation of selection suitably occurs when the client sends a FIND frame to the network 22 (step 32). Each of the servers 24–30 responds to the FIND frame by sending FOUND frame (step 34). The client 20 then identifies server types and addresses (step 36), which is described in more detail hereinbelow with reference to FIG. 5. Once the server types and addresses are identified, the desired server of the desired type is selected by the client 20 (step 37) for performing the remote boot.

Figure 1:
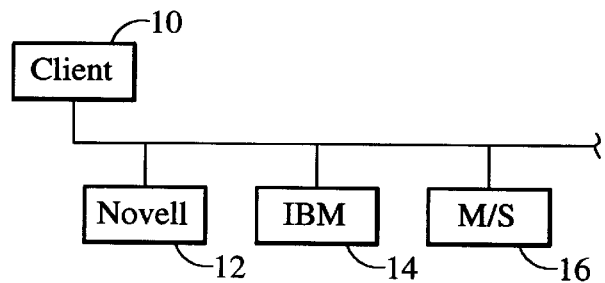
FIG. 1 illustrates a block diagram of a conventional network.
Figure 2:
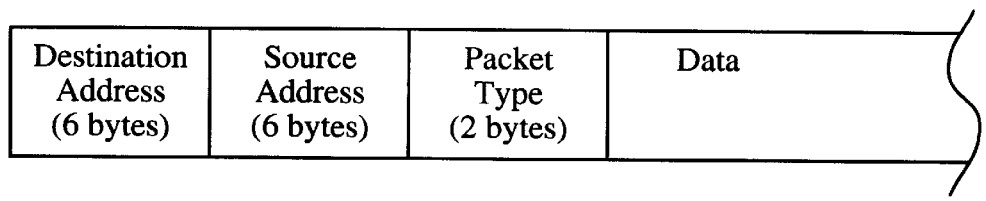
FIG. 2 illustrates an example of a FOUND frame.
Figure 5:
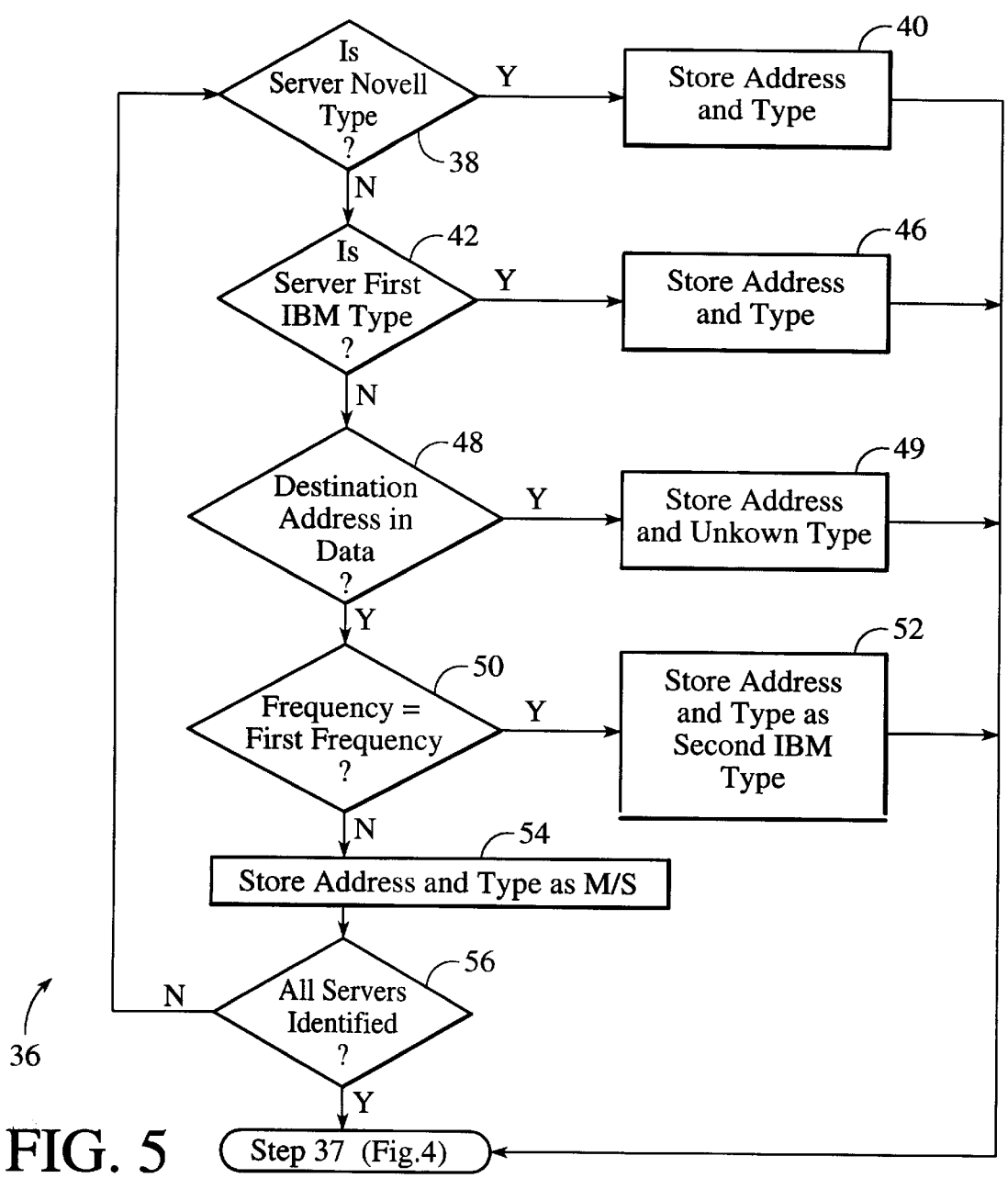
FIG. 5 illustrates a block flow diagram of the step of identifying server types from FIG. 4 in greater detail.

In identifying the server types and addresses (step 36), the present invention takes to advantage characteristic features of the FOUND frame (see FIG. 2) sent by each server type. In FIG. 5, a flow diagram of determination and identification of each server type according to the FOUND frames is illustrated. It should be appreciated that although the following description of FIG. 5 is presented in a particular order of determination and identification steps, the order is illustrative and alterable upon the needs of a particular system. Further, the identification of server types via the FOUND frames preferably results from a comparison of the specifications associated with each server software type and resultant discovery of the unique features of each for implementing the RPL protocol.

The determination and identification process suitably initiates with a determination of whether the server type is Novell, via step 38. As mentioned previously, the FOUND frame of a Novell server has a distinctive, signature mark at some offset in the data portion. Thus, identification in step 38 of the signature mark, e.g. "NOV$", indicates the server type as Novell ODI Server. If the server type is Novell, the source address from the FOUND frame along with an indication that the server type is Novell is preferably stored in a database, via step 40. The database for storing such information is suitably stored in a cache table of a memory unit, e.g., a RAM, of client 20, as is well appreciated by those skilled in the art.

If the server type is not determined to be Novell, the process continues with a determination of whether the server type is IBM, via step 42. For IBM servers operating under IBM LAN Server 3.x operating software, it has been found that the destination address from the FOUND frame is present in reverse order in the data portion at some offset. Thus, if the reverse-ordered destination address is present in the FOUND frame, the server is identified as a first IBM type server, and the type and the source address from the FOUND frame are stored in the database, via step 46. If the reverse-ordered destination address is not identified, the process continues with a determination of whether the destination address is duplicated in the data portion, via step 48. If not, the address of the server and identification as an unknown server type is made, via step 49. If so, the server type must then be identified between a Microsoft RPL Based Server (28) and an IBM server (26) operating under IBM LAN Server 4.x operating software, since both server types include the feature of duplicating the destination address in the data portion. Use of the frequency of the transmission of the FOUND frame as a distinguishing feature between these two types of servers has been found by the inventors to work well and is preferably used to identify the server type. Thus, a determination is made via step 50 of whether the frequency of the FOUND frame matches the frequency of transmission for an IBM LAN Server 4.x, the frequency of transmission being approximately 1 MHz. If so, the server type and address of the server are identified as IBM LAN Server 4.x, via step 52. If not, the server type is identified as a Microsoft RPL Based Server, and the server address and type are stored, via step 54. Upon storage of the server type and address, via step 40, step 46, step 49, step 52, or step 54, the process continues by determining whether all of the servers on the network have been identified, via step 56. Once all of the servers are identified, the formation of the database of information for selecting an appropriate server is completed.

The implementation of the identification and selection process into a single boot ROM in accordance with the present invention allows greater ability in choosing a server from which to boot to the network. Further, efficiency is improved by reducing the number of boot ROMs necessary to identify plural types and numbers of servers. This reduction to a single boot ROM also reduces costs by requiring fewer parts. Thus, the selectivity provided by the present invention ensures that with a single boot ROM the client workstation will successfully connect to a network having multiple numbers of multiple types of servers. In addition, when it is desired to allow a client access to more than one single server type, the utilization of the database of servers and types with a single boot ROM provides more flexibility and easier access to the network.

Although the above descriptions are specific, they should not be considered as limitations on the scope of the invention, but only as examples of the preferred embodiment. Many other ramifications and variations are possible within the teachings of the invention. Therefore, the scope of the invention should not be determined by the examples given, but by the appended claims and their legal equivalents.

What is claimed is:

1. A computer network system comprising:
    a plurality of servers, each of the plurality of servers operating under one of a plurality of operating systems; and
    a client workstation coupled to the plurality of servers, the client workstation including a single boot ROM, the single boot ROM containing instructions for identifying each of the plurality of servers by address and by type of operating system; and
    selecting one of the identified servers by address and type for booting on the network;
    wherein the instruction step of identifying further comprises sending a FIND frame from the client to the network, receiving the FOUND frame from each of the plurality of servers, and determining a remote program load protocol followed by the server according to characteristics of the FOUND frame, including a frequency characteristic.

2. The network of claim 1 wherein the plurality of operating systems comprise IBM LAN Server 3.x operating system, IBM LAN Server 4.x operating system, Microsoft RPL Based Servers, and Novell Netware operating system.

3. A boot ROM for choosing a particular server on the network and performing a remote boot by a client, the network including a plurality of servers operating in accordance with a plurality of network operating systems, the boot ROM containing instructions for:
    identifying each of the plurality of servers by address and by type of operating system; and
    selecting one of the identified servers by address and type for booting on the network;
    sending a FIND frame from the client to the network, and receiving a FOUND frame from each of the plurality of servers;
    determining a remote program load protocol followed by the server according to the FOUND frame, including a frequency characteristic.

4. The boot ROM of claim 3 wherein the instruction step of determining further determines if an identifying signature mark is located at a particular offset in a data portion of the FOUND frame.

5. The boot ROM of claim 4 wherein when the identifying signature mark is located, the server is identified as a first server type.

6. The boot ROM of claim 5 wherein the first server type is a Novell server.

7. The boot ROM of claim 3 wherein the instruction step of determining further determines whether a destination address of the FOUND frame is repeated in reverse order in a data portion of the FOUND frame.

8. The boot ROM of claim 7 wherein when the destination address is repeated in reverse order in the data portion of the FOUND frame, the server is identified as a second server type.

9. The boot ROM of claim 8 wherein the second server type is an IBM server operating under IBM LAN Server 3.x operating software.

10. The boot ROM of claim 3 wherein the instruction step of determining further determines whether a destination address of the FOUND frame is repeated in a same order in a data portion of the FOUND frame.

11. The boot ROM of claim 10 wherein when the destination address is repeated in a same order, a frequency of the FOUND frame is determined.

12. The boot ROM of claim 11 wherein when the frequency matches a frequency associated with a first frequency, the server is identified as a third server type.

13. The boot ROM of claim 12 wherein the first frequency is an IBM frequency and the third server type is an IBM server operating under IBM LAN Server 4.x operating software.

14. The boot ROM of claim 12 wherein when the frequency does not match the frequency associated with the first frequency, the server is identified as a fourth server type.

15. The boot ROM of claim 14 wherein the fourth server type is a Microsoft RPL Based Server.

16. The boot ROM of claim 3 wherein the instruction step of identifying further comprises forming a database table to store the address and type of operating system of each server.

17. The boot ROM of claim 16 wherein the instruction step of selecting further comprises choosing a particular one of the servers according to the stored address and operating system in the database table.

18. A boot ROM for choosing a particular server on a network and performing a remote boot by a client, the network including a plurality of servers operating in accordance with a plurality of network operating systems, the boot ROM containing instructions for:

identifying each of a plurality of servers according to characteristics of a FOUND frame including a frequency characteristic;

selecting one of the identified servers; and performing a remote program load by the boot ROM on the client through the selected one of the identified plurality of servers.

19. The boot ROM of claim 18 wherein the instruction step of identifying further comprises determining whether a destination address of the FOUND frame is repeated in a same order in a data portion of the FOUND frame, wherein when the destination address is repeated in a same order, the frequency characteristic of the FOUND frame is determined.

20. The boot ROM of claim 19 wherein when the frequency characteristic matches a frequency characteristic associated with an IBM frequency characteristic, the server is identified as an IBM server operating under IBM LAN Server 4.x operating software.

21. The boot ROM of claim 20 wherein when the frequency does not match the frequency characteristic associated with the IBM frequency characteristic, the server is identified as a Microsoft RPL Based Server.

22. The boot ROM of claim 18 wherein the instruction step of identifying further comprises determining if an identifying signature mark is located at a particular offset in a data portion of the FOUND frame, wherein when the identifying signature mark is located, the server is identified as a Novell server type.

23. The boot ROM of claim 18 wherein the instruction step of identifying further comprises determining whether a destination address of the FOUND frame is repeated in reverse order in a data portion of the FOUND frame, wherein when the destination address is repeated in reverse order in the data portion of the FOUND frame, the server is identified as an IBM server operating under IBM LAN Server 3.x operating software.

* * * * *